United States Patent Office 3,454,859
Patented July 8, 1969

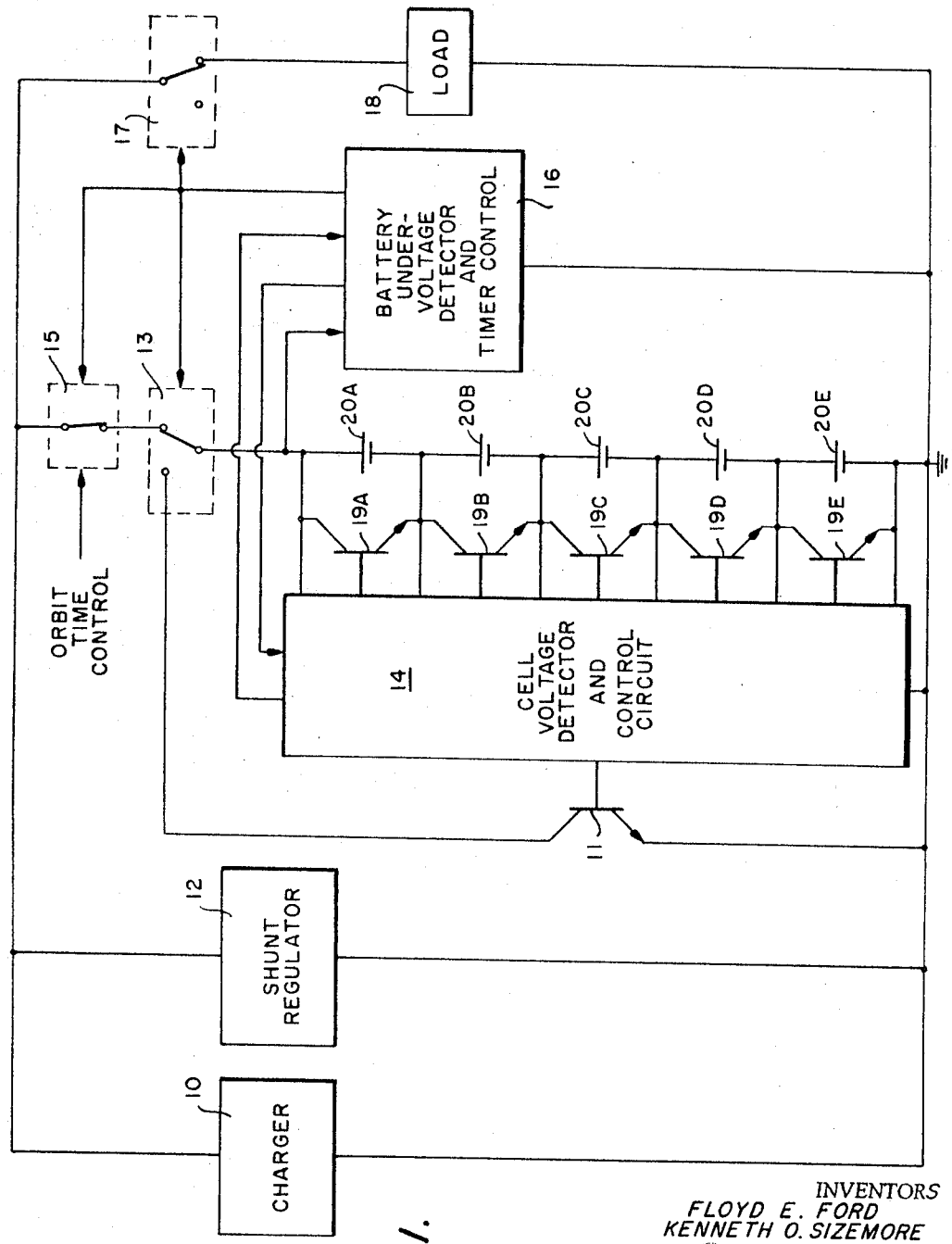

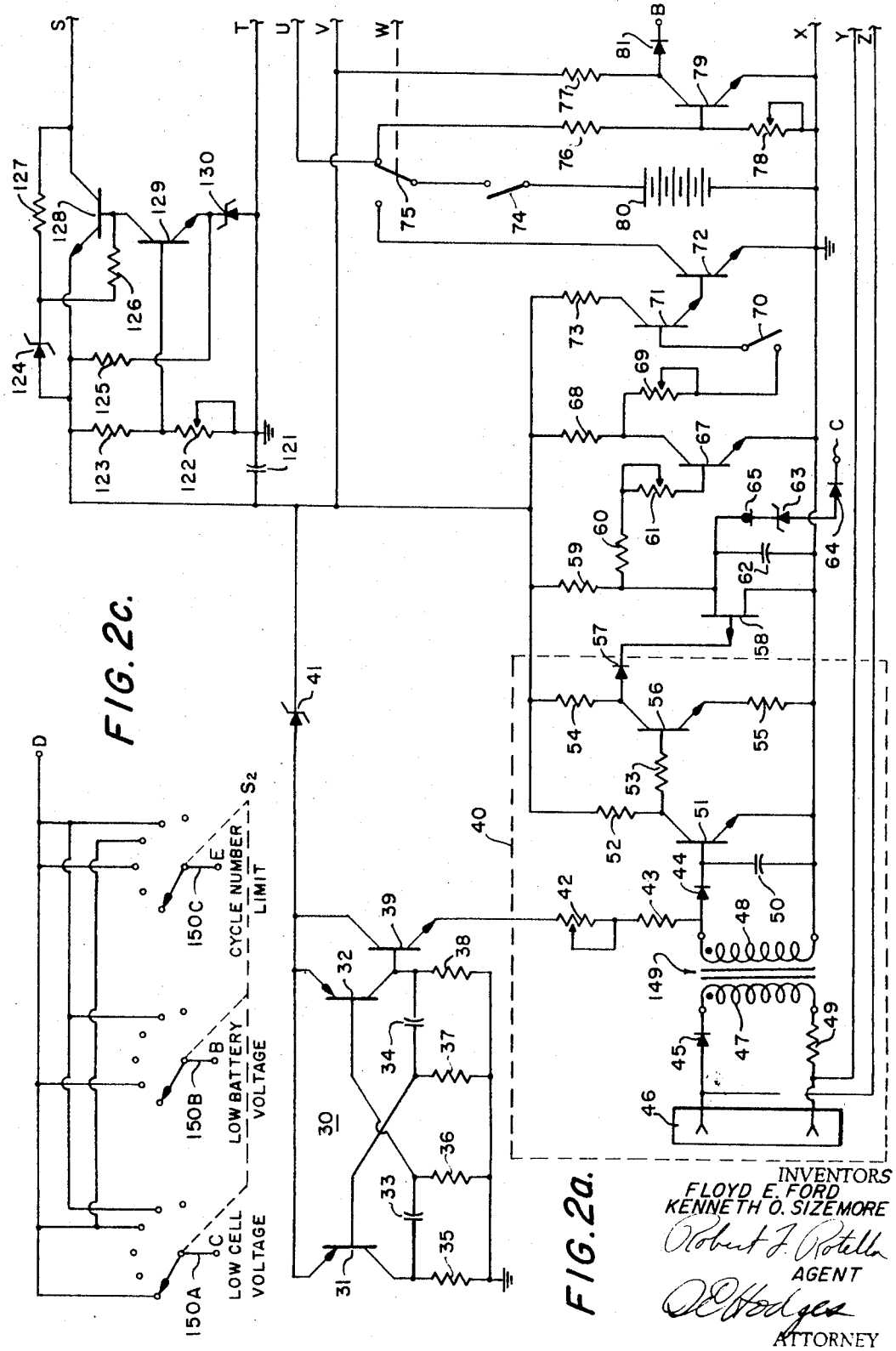

3,454,859
NICKEL-CADMIUM BATTERY RECONDITIONER
Floyd E. Ford, Davidsonville, Md., and Kenneth O. Sizemore, Washington, D.C., assignors to the United States of America as represented by the Secretary of the Navy
Filed May 23, 1967, Ser. No. 642,288
Int. Cl. H01m 45/04; H02j 7/08
U.S. Cl. 320—6                                                14 Claims

ABSTRACT OF THE DISCLOSURE

A reconditioning system for cells of the nickel-cadmium type for completely discharging the cells in a battery before charging them having a detector for determining when the battery terminal voltage drops below a preselected value, individual detectors for each cell for determining when any cell voltage drops below a preselected value and switches to remove the battery from the normal charging and discharging cycle in response to a low voltage condition. The battery is then discharged through a transistor load, then the cells are discharged through individual transistor loads; the battery discharging function being controlled by the particular cell having the lowest voltage.

Figure 2B:
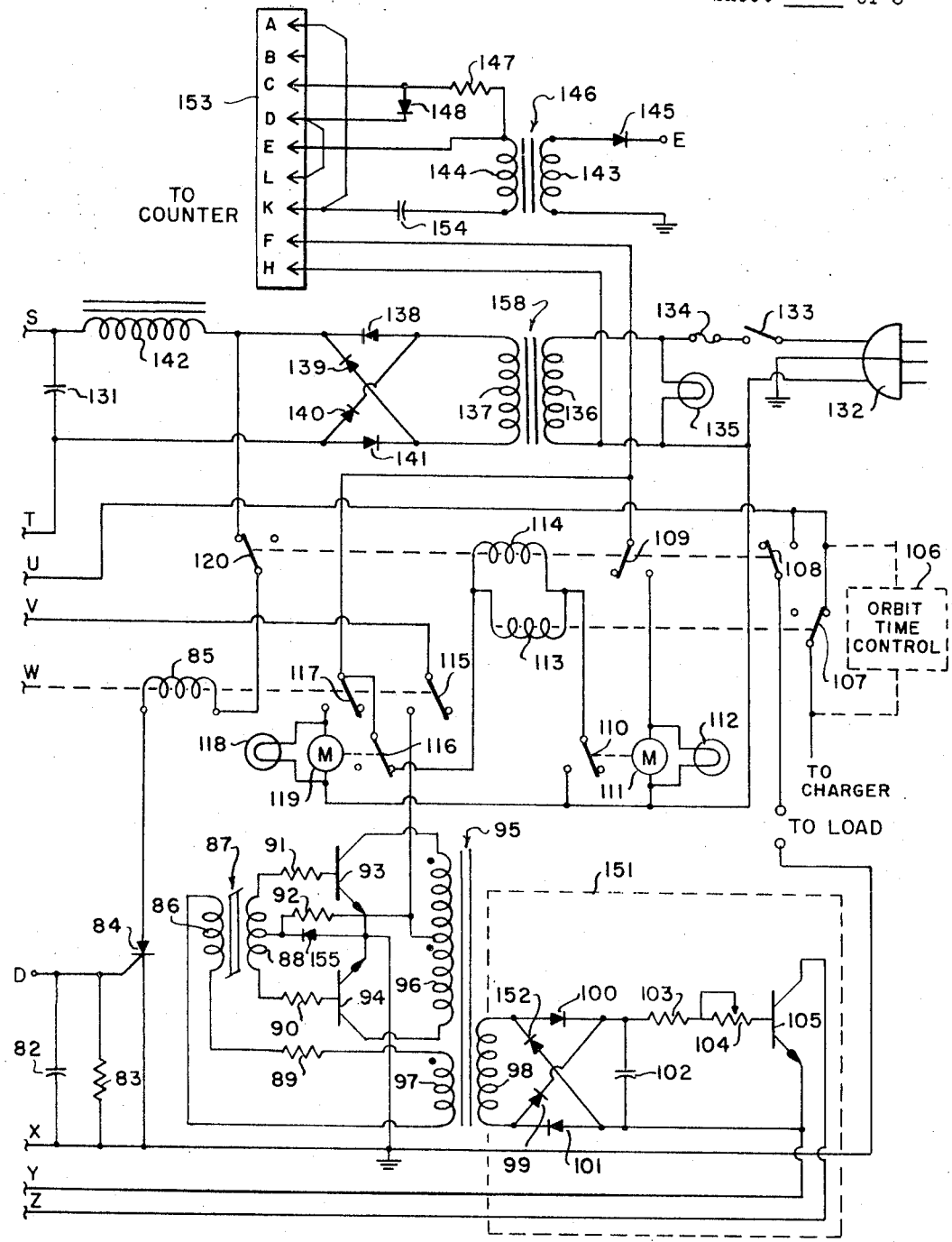

This invention refers to battery operated power systems and more particularly to a system for reconditioning batteries comprised of nickel-cadmium type cells.

Recently, the use of nickel-cadmium cells has become extensive in such applications as spacecraft power systems where high reliability and life expectancy are important considerations. In general, such battery power systems function to help satisfy peak load demands and to furnish power during dark periods when the primary solar cell power system is not operative. During periods when the solar cells are operating, the nickel-cadmium cells are recharged by means of the solar cells in conjunction with suitable control circuits. The discharge and charge cycle is repeated for the life of the spacecraft or until major component malfunction results.

It has been found that degradation of performance results when nickel-cadmium cells are subjected to repetitive cycles of charging and discharging and such cells are not completely discharged during each cycle. This phenomenon, known as the "memory effect" is thought to be due to the formation of crystal growth at the cadmium electrode and results in a progressive lowering of the ampere-hour capacity of the cell. The cell "remembers" the previous depth of discharge. Consequently, such cells fail to deliver their full rated charge under load thus degrading performance. In addition, the crystal formation will exhibit dendritic growth and, if not checked, will eventually contact the nickel electrode thus shorting the cell.

One technique for removing the memory effect is to discharge the cell as completely as possible by shorting it out or bleeding it through a suitable load and then recharging the cell fully. Cells which have been so reconditioned can then be charged to full rated capacity.

Briefly, the invention encompasses a system for completely discharging the cells before subjecting them to recharging. A detector monitors the terminal voltage of the battery and determines when it drops below a preselected value. Individual detectors monitor the voltage of each of the cells and determine when any voltage drops below a preselected value and activate control circuits to remove the battery from the load and from the normal charge/discharge cycle. The battery is then discharged through a transistor load then the cells are discharged through individual transistor loads. The battery discharge mode is controlled by the individual cell having the lowest voltage to prevent reverse charging thereof.

Accordingly, it is an object of this invention to provide an improved system for reconditioning cells of the nickel-cadmium type.

Another object of the invention is to provide means for reconditioning cells which exhibit a memory effect.

A further object of this invention is to provide a system for controlled charging and discharging of nickel-cadmium type cells.

A still further object of the invention is to provide means for restoring nickel-cadmium type cells which have lost their ability to be charged to rated capacity as a result of repetitive charging and discharging.

These and further objects and advantages of this invention will become apparent from the following detailed specification in conjunction with the accompanying drawings wherein:

FIG. 1 is a block diagram representation of the various systems comprising one form of the invention; and FIG. 2 is a circuit diagram of a preferred embodiment of the battery reconditioning system particularly adapted for use in ground based systems.

Referring now to FIG. 1, the battery reconditioner includes a plurality of nickel-cadmium type cells 20A–E, connected in series, comprising the battery to be reconditioned. Associated with each of the cells is a cell discharge transistor designated, respectively 19A–E having its collector connected to one electrode and its emitter connected to the other electrode of the cell. The electrodes of each of the cells are also fed to the cell voltage detector 14 which includes detecting means associated with each cell responsive to the voltage potential thereof. The control circuit portion of detector 14 is connected to the base electrodes of each of the cell discharge transistors 19A–E and controls the state of each transistor from non-conducting to conducting in accordance with the corresponding cell voltage sensed by the cell voltage detector.

The anode of cell 20E, corresponding to one terminal of the battery, is connected to the circuit ground while the cathode of cell 20A, corresponding to the other terminal of the battery, is connected to the common terminal of SPDT switch 13. The battery under-voltage detector 16 is connected across the battery terminals and is responsive to the voltage potential thereof.

The battery under-voltage detector and time control 16 is arranged to actuate the orbit time control switch 15 and SPDT switches 13 and 17 which connect, respectively, the battery 20 to the battery discharge transistor 11 and the load 18 to the charger 10 and shunt regulator 12. In addition, the battery under-voltage detector 16 is connected to the cell voltage detector and control circuit 14 as well as the system ground. The battery discharge transistor 11 has its base electrode connected to the detector 14 for control thereby and its collector connected to a terminal of SPDT switch 13 and its emitter grounded.

In operation, the battery reconditioning system operates as follows: Normally, load 18 is supplied with power from the charger 10 which is regulated by means of the shunt regulator 12 connected in parallel therewith. The charging current flows into the load 18 through SPDT switch 17 connected as shown. The charger is generally comprised of an array of solar cells which generate electric current in response to sunlight. Thus, in a spacecraft system, the charger 10 is operative only during the daylight period of the orbit. During the orbit dark period, the load is supplied with power from the battery comprised of cells 20A–E. In this mode, the orbit time control switch 15 which normally disconnects the battery from the power bus is closed thereby connecting the load to the battery power source. The switch 15 may be controlled by an external control system such as a timer incorporated in the battery under-voltage detector and timer control 16 for connecting the load 18 to the appropriate power source as hereinafter more fully explained.

It is when the battery is supplying power to load 18 that a low voltage condition may exist either on one or all of the cells. If the voltage of one of the cells or the terminal voltage of the battery drops below a preselected value, it is detected by the battery under-voltage detector 16 in the case of the battery terminal voltage or the cell voltage detector 14 in the case of the cell voltage. If the battery terminal voltage becomes lowered it is sensed by the under-voltage detector 16 which actuates the SPDT switch 13 (by a relay, for instance) and switches the battery discharge transistor 11 across the battery. At the same time the timer control 16 is activated for a period of time sufficient for the battery to discharge itself through transistor 11 which acts as a resistive load. In the case of a particular cell voltage being lowered, the cell voltage detector 14 monitors this condition and activates the battery under-voltage detector 16 which operates in the manner above described.

As the battery discharges through the discharge transistor 11 the individual cell voltages are continually monitored by the cell voltage detector 14. When the voltage of any cell in the battery reaches a selected value, that cell becomes the controlling cell and the battery discharge current will be reduced to zero as the controlling cell voltage approaches zero volts. Since the voltage of the lowest cell is utilized to cut off the battery discharge current, the remaining cells would not be discharged. Consequently, the individual cells are shunted by the cell discharge transistors 19A–E which act as resistive loads for the cells to discharge through to zero volts. This avoids the possibility of reverse charging any cell.

After sufficient time has elapsed to permit all cells to be discharged, the time control 16 causes the cell voltage detector and control circuit 14 to adjust the cell discharge transistors to a non-conducting state and connects the battery through switch 13 to the charger 10. In addition, the orbit time control switch 15 is deactivated and the load 18 is disconnected from the power sources by means of SPDT switch 17 also activated by the timer control 16 thereby permitting the entire charger output to recharge the battery. Once the correct charge time has elapsed the load 18 is once again connected through switch 17 to the power sources and the orbit time control is reactivated permitting normal cycling of the battery until a low voltage condition is sensed when the reconditioner becomes again operative.

Referring now to FIGURES 2a–c, for a more detailed description, it is to be understood that FIGURES 2a and 2b are to be joined at the respective circuit leads designated by S through Z. The battery reconditioner circuit comprises the battery 80 comprising a plurality of nickel-cadmium cells arranged in series connection. Although the battery is here shown to contain five cells, any suitable number of cells may be incorporated within the purview of the invention. The anode of battery 80 is connected to the system ground while the cathode is connected through an SPST switch 74 to the common terminal of an SPDT relay contact 75 which is actuated by relay coil 85 as hereinafter described. One terminal of switch 75 connects the battery to the battery discharge circuitry through the collector of transistor 72. The other terminal of switch 75 connects battery 80 through resistors 76 and 78 to the input of the battery terminal under-voltage detector through the base of transistor 79. In this position of switch 75 the battery is also connected through switch 108 to whatever load is being employed and through switch 107 to the battery charger.

The battery terminal under-voltage detector comprises transistor 79 having its base connected to the junction of resistors 18 and 19, its emitter grounded and its collecter fed through biasing resistor 77 to the DC line from the power supply. The anode of diode 81 is connected from the collector to the point designated B which is connected to the input of a rotary switch 150B as shown in FIG. 2C. Resistors 76 and 78 form a voltage divider across the terminals of battery 80 with the relative percentage drop being adjusted by varying resistor 78. The drop is selected to permit transistor 79 to saturate when the battery voltage exceeds a certain level (e.g 5 volts). If the battery voltage drops below this level, transistor 79 comes out of saturation thus providing an increasing collector voltage. Diode 81 becomes forward biased and allows the collector voltage to appear at point B. Resistor 77 acts as a current limiter when transistor 79 is in saturation and forms a voltage divider with resistor 83 when out of saturation. When rotary switch 150B is is an appropriate position it allows voltages appearing at point B to appear at point D. In addition points C and E are similarly connected to point D by means of rotary switches 150A and 150C, respectively.

A silicon controlled rectifier (SCR) 84 has its gate electrode connected to point D as well as to ground through the parallel capacitor 82 and resistor 83. The rectifier anode is connected to one side of the winding coil of relay 85 and the cathode is grounded. The input control to the SCR is the voltage appearing at point D, which, as described above, consists of either the low cell voltage indication C, fed into switch 150A, low battery voltage B, fed into switch 150B, or the cycle number limit indication E, fed into switch 150C. The rotary switches 150A–C are ganged together and designated as S2 and effectively operates as an OR circuit since any one input or combination of inputs will result in an output at point D. When an indication appears at point D, SCR 84 will be gated on causing it to conduct and energizing the winding of relay 85 which is connected through SPDT switch 120 to the DC power supply line. When relay 85 is energized, it causes switches 75, 115 and 117 to switch contacts. SPDT switch 75 will connect the battery 80 across the battery discharge transistor 72. Switch 117 will activate timer motor 119 and indicator lamp 118 by applying AC power from plug 132 thereto. Switch 115 will connect the DC supply to bias transistors 93 and 94 comprising a portion of the inverter circuit.

With the terminals of battery 80 shunted by transistor 72, the battery discharge current is controlled by the bias condition set on transistor 71 by resistors 68, 73 and potentiometer 69. Transistor 71 has its emitter connected to and controlling the base of transistor 72. The collector of transistor 71 is connected through resistor 73 to the DC supply and its base is connected through SPST switch 70 and potentiometer 69 to the collector of transistor 67. Transistor 67 has its emitter grounded, its collector connected through resistor 68 to the DC supply line and its base connected through potentiometer 61 and resistor 60 to the source electrode of field-effect transistor (FET) 58. The source electrode of FET 58 is connected through resistor 59 to the DC supply line.

Transistor 67 is normally in a cutoff condition when the cell voltages being monitored by the detectors 40 are above the level set for detector control. Accordingly, the current available through resistor 68 becomes the base current of transistor 71. As a result of the interconnection of transistors 71 and 72, the collector-to-emitter current (battery discharge current) is directly related to the base current of transistor 71. Potentiometer 69 provides an adjustment for setting the maximum battery discharge current. SPST switch 70 provides manual override to prevent discharge of the battery 80 by transistor 72 when it is desired to utilize only the individual cell discharge transistors as loads.

The cell voltage detectors 40 operate in a manner similar to the detectors disclosed in Ser. No. 550,090, filed May 11, 1966, and assigned to the assignee of the present invention and comprise a separate identical unit associated with each cell comprising battery 80. Each of the detectors 40 are connected together at the cathode of diode 57 thereby forming an OR gate as will be more fully described hereinafter. The detectors comprise a diode 57 having its anode connected to the collector of transistor 56. Transistor 56 has its collector also connected through resistor 54 to the DC supply line and its emitter grounded through resistor 55. Transistor 51 has its emitter grounded and its collector connected through resistor 53 to the base of transistor 56 and through resistor 52 to the DC supply line. The input to the detector 40 comprises a jack 46 for making connection to the positive and negative electrodes of each cell. Diode 45 and resistor 49 are inserted in the legs connected to the primary or DC winding 47 of transformer 149. The AC or secondary winding 48 is connected through diode 44 to the base of transistor 51 and, directly, to the grounded emitter. A capacitor 50 is connected between the base and emitter. Connected to the anode of diode 44 through resistor 43 and potentiometer 42 is the output of square wave generator 30.

Square wave generator 30 comprises a conventional free-running multivibrator consisting of transistors 31 and 32 having their emitters tied together and connected through Zener diode 41 to the DC supply line. Zener diode 41 provides constant operating voltage for the square wave generator. The base of transistor 31 is connected through capacitor 34 to the collector of transistor 32 and the base of the latter is connected through capacitor 33 to the collector of the former. The collectors of transistors 31 and 32 are grounded through resistors 35 and 38, respectively, as are the bases through resistors 37 and 36, respectively. The base of transistor 39 is connected to the collector of transistor 32 and its collector is connected to the Zener-regulated DC supply line. The emitter of transistor 39 constitutes the square wave generator 30 output fed to the detector 40. Transistor 39 operates as an impedance transforming stage between the multivibrator and detector.

As the cell voltage increases, the D-C current through diode 45 decreases, due to biasing, and causes a resulting increase in the dynamic impedance of the diode. This change in dynamic impedance is reflected from the primary side 47 to the secondary side 48 of transformer 149 as an increasing impedance across the voltage divider formed by winding 48 together with resistances 42 and 43. When the cell voltage at the detector input is high, the reflected dynamic impedance on the secondary side is small; therefore, only a small voltage drop supplied by the square wave generator 30 appears across the windings. Consequently, no current is available at the base of transistor 51 and it is cutoff. As the cell voltage decreases the voltage at the anode of diode 44 increases causing it to become forward biased and enabling capacitor 50 to store energy from the square wave generator 30 and increase the voltage level across it. The increasing capacitor voltage causes transistor 51 to come out of cutoff and enter the active region. The voltage at the anode of diode 44 then controls the collector voltage of transistor 51. Potentiometer 42 enables adjustment of the cutoff point of transistor 42. Since the collector voltage of transistor 51 is high when the cell voltage is high an inverter stage comprising transistor 56 having its base connected through resistor 53 to the collector of transistor 51 is provided. The collector is connected through resistor 54 to the DC supply line and the emitter is grounded through resistor 55. The output taken from the collector is fed to the anode of diode 57. The cathode of diode 57 is connected to the cathodes of the corresponding detector diodes thereby forming an OR circuit feeding the input of the control circuit.

The cathode of diode 57 is connected to the gate electrode of FET 58 which is connected to the remainder of the control circuit as above described. As the detector output voltage increases the voltage as the gate and source electrodes of the FET increases biasing transistor 67 into the active region. FET 58 acts nearly as an ideal voltage control and prevents a summing effect from the OR connected of detectors 40. Accordingly, the detector having the highest output voltage (corresponding to the lowest cell voltage) will control irrespective of the lower levels of the remaining detectors.

Transistors 58 and 67 are biased by resistor 59, and resistors 60 and 61, respectively. Transistor 67, initially in the conducting region, eventually becomes saturated as the cell voltage decreases and causes transistors 71 and 72 to become gradually cutoff thus reducing the battery discharge current to zero. Potentiometer 61 permits the cutoff control to be adjusted for either sharp or linear response.

The output of FET 58 is connected to the gate electrode of SCR 84 through field-effect diode 65, Zener diode 63 and diode 64 through point C and rotary switch 150A. This network provides for controlled discharge of the battery if a cell voltage comes within the active region of the detector 40 before an under-voltage condition occurs across the battery terminals, thus preventing reverse charging of any cells. The field-effect diode 65 is a current limiting device to prevent loading the output of FET 58. An example of suitable devices for this application are the Motorola MCL–1300 series of field effect diodes. Zener diode 63 provides a D-C level shift to compensate for the off-set voltage at the source electrode of FET 58. Diode 64 forms part of the OR configuration made through rotary switches 150A–C to point D, the gate of SCR 84, and prevents interaction from the other sources tied thereto.

The circuit for driving the individual cell discharge transistors comprises a DC—DC inverter consisting of transistors 93, 94 having their emitters tied together to ground and their collectors connected to each end of primary winding 96 of transformer 95. The bases of transistors 93, 94 are fed through resistors 24, 23, respectively, to winding 88 of transformer 87. The center top of winding 88 is connected through resistor 92 to the center top of transformer 96 and then to one terminal of SPDT switch 115 for connection to the DC supply line. Diode 155 is connected between the center top of winding 88 and the grounded emitters. Winding 86, associated with transformer 87, is connected through resistor 89 to winding 97, associated with transformer 95. This configuration is a standard two-transformer DC-AC-DC inverter network with the addition of diode 155 and resistor 92 to insure positive starting when power is applied.

The secondary circuit of the cell discharge network comprises a separate identical unit 151 associated with each of the cells comprising the battery 80 and consists of a secondary winding 98 associated with transformer 95 feeding a conventional full wave bridge rectifier comprised of diodes 99, 100, 101 and 152. A capacitor 102 is connected across the DC output of the diode bridge for smoothing purposes. Resistor 103 and potentiometer 104 are connected between the base of transistor 105 having low saturation current characteristics and the diode bridge. The emitter and collector of the cell discharge transistor are connected to the appropriate cell by means of jack 46. Resistor 103 operates as a current limiter and potentiometer 104 adjusts the cell discharge current by controlling the amount of bias current fed from the rectifier bridge to transistor 105. Each discharge transistor 105 discharges its respective cell to approximately zero volts.

After sufficient time has elapsed for all cells to be completely discharged, timer 119 actuates switch 119 applying A-C line voltage to relay coils 113 and 114. Relay 114 activates switches 120, 108 and 109 thereby de-energizing relay coil 85, opening the battery load circuit and starts the charge period timer 111 and indicator lamp 112, respectively. Relay coil 113 is actuated to bypass the orbit time control 106. Battery 80 is now charged by the suitable external charger connected through switch 107 and remains on charge for a period determined by the setting of timer 111. At the end of the charge interval, the relay coil 114 is deactivated and battery 80 is returned to the normal cycling pattern. The battery is maintained on a standby basis as long as SPST switch 74 is in a closed position.

Battery 80 may also be subjected to periodic reconditioning automatically after being subjected to a given number of charge/discharge cycles by use of a conventional number counter, not shown. The counter is connected by means of jack 153 to the remainder of the circuit. After a predetermined number of cycles, the counter will produce a suitable signal from a set of internal contacts which is fed through the terminals in jack 153 to a pulse shaping network formed by resistor 147, winding 144 of transformer 146 and capacitor 154. The pulse passes through the transformer to winding 143 and diode 145 and appears at point E which is connected to rotary switch 150C and point D. Since point D is connected to the gate electrode of SCR 84 the counter output pulse will gate it on thereby switching battery 80 to controlled discharge as described above. The counter is powered from the AC line through terminals F and H of jack 153. Diode 148 is an acc-suppressor to protect the contacts of the counter.

The battery reconditioner is operated from a connection to the AC line made through a three-wire plug 132, SPST switch 133 and fuse 134. An indicator lamp 135 is wired across the circuit. AC power is fed through a step-down transformer 158 having primary secondary windings 136 and 137 to a conventional full-wave bridge rectifier comprised of diodes 138–141 and through an L-C ripple filter comprised of a series choke 142 and shunt capacitor 131. The DC output is then fed to a conventional regulator network comprised of transistors 128 and 129 connected together at the base of the former and collector of the latter. The positive DC line is fed to the collector of transistor 128 and the negative DC line is fed through Zener diode 130 to the emitter of transistor 129. The emitter of transistor 129 is connected through resistor 125 to the emitter of transistor 128. The emitter of transistor 128 is connected through Zener diode 124 to the collector, via resistor 127, and to the base, via resistor 126. The base of transistor 129 is connected to the node between resistor 123 and potentiometer 122, the former being connected to the positive DC line and the latter grounded. A capacitor 121 is also connected between the positive DC line and ground.

This invention is not restricted to the use of nickel-cadmium type cells but may be used with any other electrochemical cells or energy storing or generating device that is comprised of discrete voltage increments such as fuel cells.

Having described the invention, it will be apparent that many modifications will be obvious to one skilled in the art and, consequently, the scope of the invention is to be measured solely by the following claims.

What is claimed is:

1. A system for reconditioning electrochemical cells comprising:
   a plurality of cells comprising a battery,
   battery terminal voltage detecting means responsive to the terminal voltage of said battery,
   cell voltage detecting means responsive to the voltage of each of said plurality of cells,
   battery discharge means connectable to said battery for discharge thereof,
   said battery discharge means being connected to said battery in response to a predetermined condition sensed by said battery terminal voltage detecting means and being disconnected from said battery in response to a predetermined condition sensed by said cell voltage detecting means.

2. A system for reconditioning electrochemical cells as set forth in claim 1 wherein:
   said battery terminal voltage detecting means comprises transistor switch means,
   said transistor switch means being in a first state when said battery terminal voltage is above a predetermined value and in a second state when said voltage is below said predetermined value.

3. A system for reconditioning electrochemical cells as set forth in claim 2 wherein:
   said cell voltage detecting means comprises variable impedance means connected to each of said plurality of cells.

4. A system for reconditioning electrochemical cells as set forth in claim 3 wherein:
   said battery discharge means comprises transistor load means connected across said battery.

5. A system for reconditioning electrochemical cells as set forth in claim 4 further comprising:
   silicon controlled rectifier means responsive to either said battery terminal voltage detector means or said cell voltage detecting means for connecting said battery to said battery discharge means.

6. A system for reconditioning electrochemical cells as set forth in claim 5 wherein:
   said cell voltage detecting means comprises a transformer having a primary winding and a secondary winding.
   said primary winding being connected by means of a diode to the electrodes of said cell,
   said secondary winding being connected through a diode to transistor switching means, and
   energy supply means being connected to said secondary winding.

7. A system for reconditioning electrochemical cells as set forth in claim 6 further comprising:
   a capacitor connected to said transistor switching means for storing energy supplied by said energy supply means,
   said energy supply means comprising square wave generator means,
   the impedance of said primary winding and diode being reflected onto said secondary winding,
   whereby a cell voltage above a pretermined value will cause a small reflected impedance and a cell voltage below said predetermined value will cause a high reflected impedance thereby causing the energy stored in said capacitor to increase and turn said transistor switching means on, and
   inverter means connected to the output of said transistor switching means.

8. A system for reconditioning electrochemical cells as set forth in claim 7 wherein:
   a diode is connected to the output of said inverter means,
   each of the cell voltage detecting means being connected at the corresponding electrode of their respective diodes thereby forming on OR network, whereby,
   the output of said OR network corresponds to the cell having the lowest voltage across its electrodes.

9. A system for reconditioning electrochemical cells as set forth in claim 8 further comprising:
   field effect transistor means connected to the output of said OR network,
   the output of said field effect transistor means being connected through current limiting diode means to said silicon controlled rectifier means.

10. A system for reconditioning electrochemical cells as set forth in claim 9 wherein:
    said current limiting diode means comprises a field effect diode.

11. A system for reconditioning electrochemical cells as set forth in claim 10 wherein:
    the output of said field effect transistor means controls said transistor load means in said battery discharge means, whereby, said battery will be discharged through said battery discharge means at a fast rate until the voltage of any of said cells approaches zero.

12. A system for reconditioning electrochemical cells as set forth in claim 11 further comprising:

cell discharge means associated with each of said plurality of cells for discharging said cells to zero volts.

13. A system for reconditioning electrochemical cells as set forth in claim 12 wherein:

said cell discharge means comprises transistor load means connected to a cell, said transistor load means being actuated by response from said silicon controlled rectifier means.

14. A system for reconditioning electrochemical cells as set forth in claim 13 further including:

means for selectively placing said battery in a discharge condition periodically after said battery has experienced a predetermined number of charge and discharge cycles.

References Cited

UNITED STATES PATENTS

| | | | |
|---|---|---|---|
| 2,051,514 | 8/1936 | Block | 320—40 |
| 3,258,670 | 6/1966 | Piechon | 320—6 |
| 3,278,824 | 10/1966 | Runyon | 320—29 |
| 3,293,529 | 12/1966 | Fontaine | 320—15 |
| 3,305,754 | 2/1967 | Oaks et al. | 320—40 X |
| 3,355,651 | 11/1967 | Olson | 320—31 |

JOHN F. COUCH, *Primary Examiner.*

STANLEY WEINBERG, *Assistant Examiner.*

U.S. Cl. X.R.

320—11, 13, 31, 40